US012671568B2

(12) United States Patent
Fang et al.

(10) Patent No.: US 12,671,568 B2
(45) Date of Patent: Jun. 30, 2026

(54) DEVICE FOR COUNTERACTING SIDE-CHANNEL ATTACKS

(71) Applicant: National University of Singapore, Singapore (SG)

(72) Inventors: Qiang Fang, Singapore (SG); Longyang Lin, Singapore (SG); Massimo Alioto, Singapore (SG)

(73) Assignee: National University of Singapore, Singapore (SG)

( * ) Notice: Subject to any disclaimer, the term of this patent is extended or adjusted under 35 U.S.C. 154(b) by 63 days.

(21) Appl. No.: 18/839,304

(22) PCT Filed: Feb. 16, 2023

(86) PCT No.: PCT/SG2023/050088
§ 371 (c)(1),
(2) Date: Aug. 16, 2024

(87) PCT Pub. No.: WO2023/158378
PCT Pub. Date: Aug. 24, 2023

(65) Prior Publication Data
US 2026/0019229 A1      Jan. 15, 2026

(30) Foreign Application Priority Data
Feb. 16, 2022      (SG) ............................ 10202201503P

(51) Int. Cl.
*H04L 9/00*      (2022.01)
*H04L 9/06*      (2006.01)
(52) U.S. Cl.
CPC ............ *H04L 9/003* (2013.01); *H04L 9/0631* (2013.01)

(58) Field of Classification Search
CPC .............................. H04L 9/003; H04L 9/0631
See application file for complete search history.

(56) References Cited

U.S. PATENT DOCUMENTS

| | | | | |
|---|---|---|---|---|
| 2018/0262327 A1* | 9/2018 | Jain | ................... | H04L 12/40013 |
| 2021/0357741 A1* | 11/2021 | Jha | ........................... | G06N 3/08 |
| 2023/0259638 A1* | 8/2023 | Yang | ....................... | G06F 21/72 |
| | | | | 726/26 |

FOREIGN PATENT DOCUMENTS

| | | |
|---|---|---|
| CN | 113221118 A | 8/2021 |

OTHER PUBLICATIONS

Justin, "Integrated and Distributed Digital Low-Drop-Out Regulators with Event-Driven Controls and Side-Channel Attack Resistance", Dissertation for Doctor of Philosophy of the Graduate School of Arts and Science, Columbia University, 2021, 24 pages.

(Continued)

*Primary Examiner* — Syed M Ahsan
(74) *Attorney, Agent, or Firm* — Dority & Manning, P.A.

(57)      ABSTRACT
A device for counteracting side-channel attacks (SCA), including a machine learning unit (MLU) that is connectable to a cryptographic core. The MLU includes: a feature extractor unit configured to extract selected information-sensitive signals from the cryptographic core and to generate machine learning features based on the selected information-sensitive signals; and a machine learning-based power estimator unit configured to output cumulative information-sensitive energy based on the generated machine learning features. The device further includes a power compensation unit that is configured to cancel out the cumulative information-sensitive energy so as to counteract side-channel attacks (SCA).

9 Claims, 3 Drawing Sheets

(56)                     References Cited

OTHER PUBLICATIONS

Fu et al., "Linear Regression Side Channel Attack Applied on
Constant XOR", 2017, 11 pages.
International Search Report and Written Opinion received in cor-
responding Application No. PCT/SG2023/050088, dated Aug. 16,
2023, 9 pages.

* cited by examiner

| MTD | unprotected AES | protected AES |
|---|---|---|
| power | 10K | >1.2B (>120,000x) |
| EM | 20K | >1.2B (>60,000x) |

| TVLA (\|t\|-value=4.5) | unprotected AES | protected AES |
|---|---|---|
| power | 800 | ~750M (~937,500x) |
| EM | 900 | ~250M (~277,780x) |

DEVICE FOR COUNTERACTING SIDE-CHANNEL ATTACKS

CROSS-REFERENCE TO RELATED APPLICATIONS

This application is the U.S. National Stage entry of International Application No. PCT/SG2023/050088, filed on Feb. 16, 2023, which, in turn, claims priority to SG patent application Ser. No. 10202201503P, filed on Feb. 16, 2022, both of which are hereby incorporated herein by reference in their entireties for all purposes.

FIELD OF INVENTION

The present invention relates broadly, but not exclusively, to frameworks and devices for counteracting side-channel attacks.

BACKGROUND

Side-channel attack counteraction has become a basic requirement in secure integrated circuits with sensitive data, and preventing side-channel leakage such as power consumption and electromagnetic (EM) emissions. Over time, the implementation of protection techniques has moved from design-specific frameworks to design-reusable frameworks.

Compared with design-specific frameworks, design-reusable frameworks allow the reuse of the protected IP in various designs to reduce design cost and security assessment effort. These counteractions usually degrade the attack SNR by embedding protection techniques into voltage regulators such as current equalization, switching regulator with randomized loop control, DLDO with noise injection, DLDO with randomized thresholds and AES transformations, DLDO with edge-chasing quantizer, current-domain signature attenuation and additional time varying transfer function. Such protections allow design reuse and some degree of power-security flexibility, but have common limitations in that they compensate the fluctuations of the entire power consumption rather than the small-signal information-sensitive power contributions, which in turn limits the reduction in power overhead. Furthermore, in prior art counteraction frameworks, the level of protection is usually set at design time, and cannot improve after chip fabrication. Thus, they cannot adapt to mitigate newly discovered side-channel vulnerabilities and attacks.

Indeed, power overhead and security upgradeability over time are crucial in energy-autonomous systems with long lifespans and in applications where device replacement is expensive or unfeasible (e.g., IoT, implantables).

SUMMARY

According to one embodiment, there is provided a device for counteracting side-channel attacks (SCA), comprising: a machine learning unit (MLU) that is connectable to a cryptographic core, wherein the MLU comprises: a feature extractor unit configured to extract information-sensitive signals from the cryptographic core and to generate machine learning features based on the information-sensitive signals; and a machine learning-based power estimator unit configured to output cumulative information-sensitive energy based on the generated machine learning features; and a power compensation unit that is configured to cancel out the cumulative information-sensitive energy so as to counteract side-channel attacks (SCA).

The information-sensitive signals from the cryptographic core may be selected based on multiplexing and/or clock gating logic.

The machine learning-based power estimator unit may adopt a linear regression model. The linear regression model may be based on equation (1) as follows:

$$y(w, x) = w_0 + \sum_{k=1}^{K}\sum_{d=1}^{D} w_{kd}x_{kd} \qquad \text{Eq. (1)}$$

where:

x are the generated machine learning features from the feature extractor unit, w are pre-trained machine learning model parameters, K represents a number of subkey blocks, and D represents selected one or more of the generated machine learning features.

The pre-trained machine learning model parameters may be updatable and subsequently mappable into the linear regression model to implement a hardware patch.

The power compensation unit may be connectable to a supply source, and the power compensation unit may be configured to draw an equivalent energy from the supply source to cancel out the cumulative information-sensitive energy.

The power compensation unit may comprise an N-bit capacitive digital-to-analog converter standard cell comprising N binary scaled gate clusters. N may be equal to 10, and the cumulative information-sensitive energy may be expressed as 10-bit control signals. A transition and an energy contribution of each of the gate clusters may be enabled if a corresponding input bit from the MLU is 1.

BRIEF DESCRIPTION OF THE DRAWINGS

Embodiments are provided by way of example only, and will be better understood and readily apparent to one of ordinary skill in the art from the following written description, read in conjunction with the drawings, in which.

DETAILED DESCRIPTION

Figure 1:
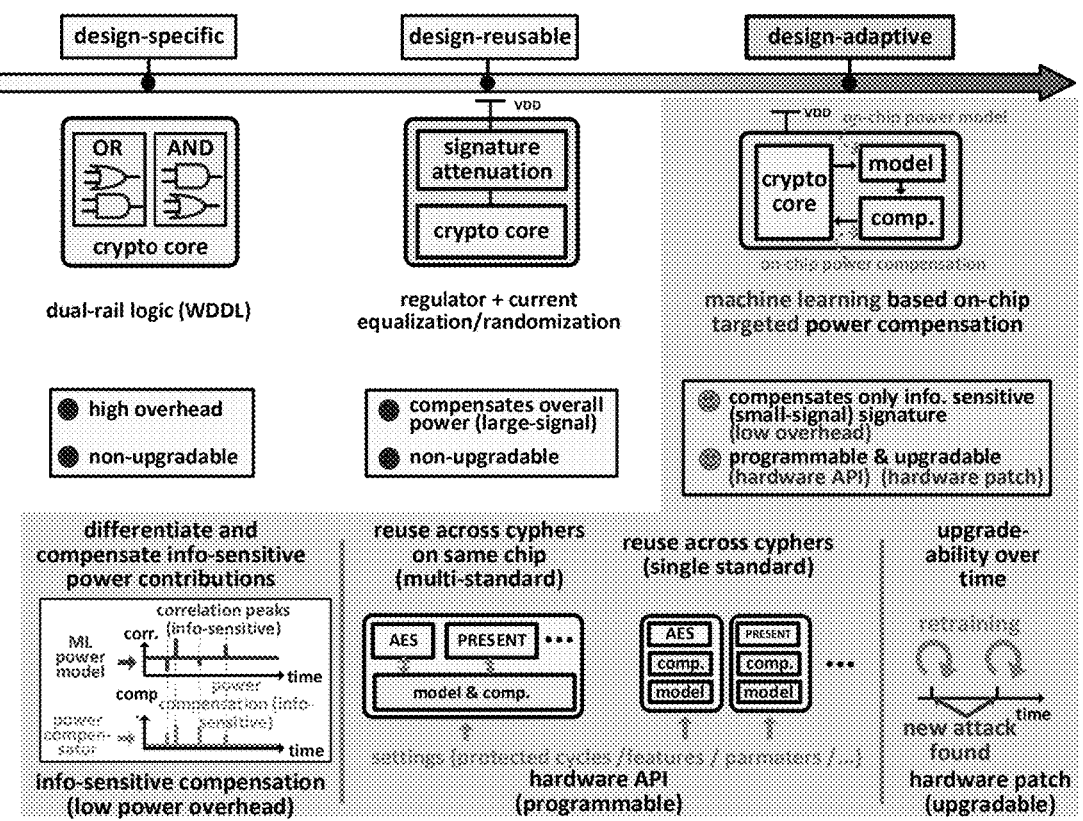
FIG. 1 shows two prior art classes of frameworks (outside shaded region) and a design-adaptive framework according to an embodiment (within shaded region).

Embodiments will be described, by way of example only, with reference to the drawings. Like reference numerals and characters in the drawings refer to like elements or equivalents.

Embodiments of the invention relate to a machine learning-based design-adaptive hardware counteraction approach against side-channel attacks (SCA). Embodiments of the invention enable post-silicon upgradeability and security fixes over time, reuse across ciphers under single- and multi-standard encryption, and targeted compensation of information-sensitive power contributions for low power overhead.

According to an implementation, a lightweight on-chip machine learning power model (MLPM) is used to estimate a cryptographic core's (crypto-core's) information-sensitive energy. In the following description, the term "information-sensitive signal" refers to a key-related signal or a signal that a crypto key is involved in its generation. The MLPM input is given by an on-chip feature extraction unit, extracting information-sensitive signals from blocks to protect. The MLPM output is information-sensitive energy of the blocks to protect. The machine learning weight updates allow post-silicon improvements and large scale deployment of security fixes throughout the device lifespan. The MLPM may be iteratively trained for updating so that possible information leakage is fully included in the model. Advantageously, few training iterations are sufficient to increase the minimum traces to key disclosure (MTD) to state-of-the-art values or better. The MLPM output drives an N-bit power digital-to-analog converter (powerDAC, also referred to as "capDAC" in the following description) with stdcell-based design to offset the information-sensitive energy of crypto-cores. The linearity of the N-bit powerDAC may be further improved by inserting and training redundant least significant bits (LSBs) for fine compensation with higher accuracy.

Prototypes according to embodiments of the invention have been developed for both AES and PRESENT crypto-cores and the protection performance is proven by silicon measurement results. The Minimum Trace to Disclose (MTD) for protected cores (using embodiments of the invention) exceeds 1.2B with over 60,000× improvement compared with unprotected cores, which is among the best compared with the state-of-the-art. The MLPM according to embodiments of the invention may use a linear regression model, and can be replaced with other machine learning models (e.g., random forest, neural network). The protected crypto-cores can be extended to other ciphers or even other digital circuits (e.g., neural network accelerator).

Embodiments of invention relate to a design-adaptive framework for counteracting/mitigating side-channel attacks. With reference to FIG. 1, compared with two prior art classes of frameworks, the design-adaptive framework (in shaded region) leverages a machine learning-based on chip targeted power estimation and compensation unit, which enables post-silicon upgradeability and security fixes over time for "hardware patch", reuse across ciphers in single- and multi-standard secure chips by simply changing its configuration parameters like "hardware API", and targeted compensation of small-signal information-sensitive power contributions for lower power overhead counteraction.

Compared to prior art (off-chip) machine learning-assisted frameworks, embodiments of invention provide an on-chip run-time machine learning model with flexible size, comprehensive feature availability, flexible selection to adapt to different ciphers and different microarchitectural implementations of the same cipher. Hence, the machine learning-based protection framework according to embodiments of invention offers a higher degree of flexibility and adaptation to different designs and upgradeability to counteract new attacks. This ultimately favors design reuse and also uniquely enables hardware patching against side-channel attacks, maintaining high security standards during the lifespan of a device and even allowing improvements over time.

Figure 2:
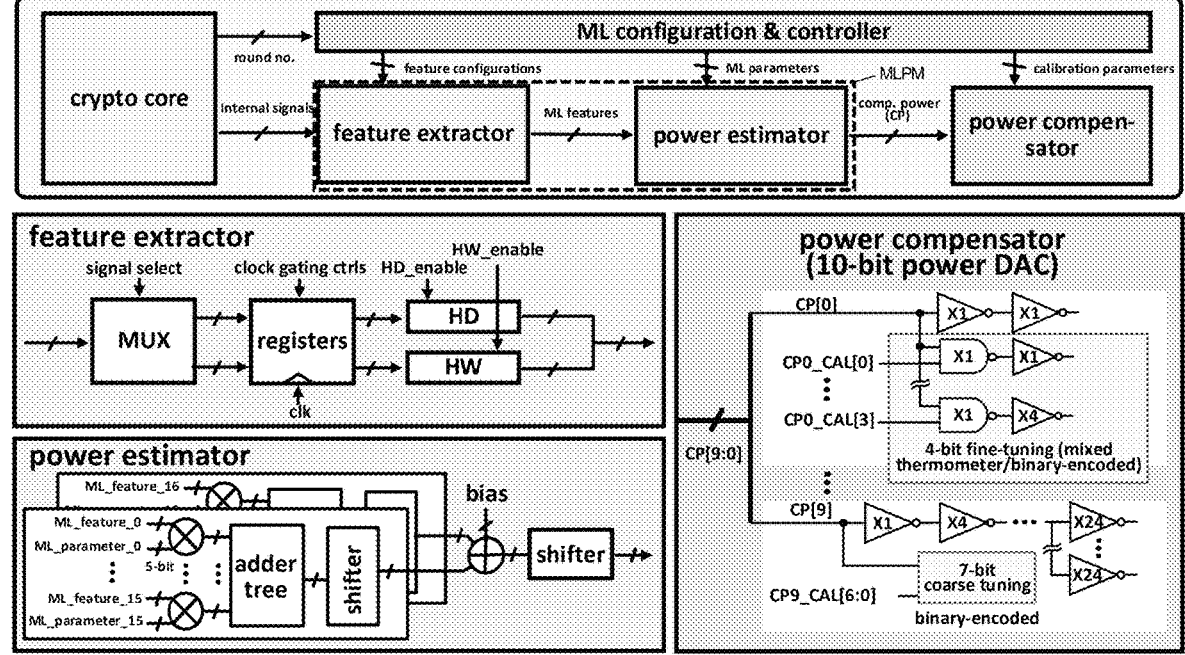
FIG. 2 is a schematic of a machine-learning-based design-adaptive side-channel attack counteraction framework/device, according to an embodiment.

FIG. 2 shows an architecture of a machine-learning-based design-adaptive side-channel attack counteraction framework and device, according to an embodiment of the invention. The device comprises an on-chip machine learning power model (MLPM). The MLPM comprises a feature extractor unit and a machine learning-based power estimator unit. The device further comprises a power compensation unit to compensate any information leakage at run time.

The machine learning power model (MLPM) input features are generated by the feature extractor unit, which are directly taken from the crypto-core signals. Since not all signals from all rounds are involved in information leaking, signal selection via multiplexing and clock gating logic is introduced to prevent the un-necessary power overhead of extracting unused features. After that, the selected signals are sent to the hamming distance (HD) and hamming weight (HW) blocks to generate the features that are universally used in side-channel attacks.

Next, the generated machine learning features are sent to the power estimator unit, where a lightweight linear regression model is adopted for MLPM as shown in Eq. 1. Here x are the machine learning features from the feature extractor unit, and w are the pre-trained machine learning model parameters. The detailed training process will be described below. K and D represent the number of subkey blocks and selected one or more of the generated machine learning features, respectively. Subkey block means that the complete crypto key is usually large (e.g. 128-bit for AES-128) so that potential attackers divide the complete key into sub-blocks (e.g. 16 bytes of sub-block) and carry an attack one by one. The MLPM output is the cumulative information-sensitive energy during an encryption, expressed as a 10-bit control signals to drive the subsequent power compensation DAC.

$$y(w, x) = w_0 + \sum_{k=1}^{K}\sum_{d=1}^{D} w_{kd} x_{kd} \qquad \text{Eq. (1)}$$

In summary, the machine learning power model (MLPM) may be implemented as a machine learning unit (MLU). The MLU models the cumulative energy associated with the data-sensitive signal transitions (i.e., correlated to the key) within the cryptographic core ("crypto-core") during an encryption. The MLU input features are directly selected from the cryptographic core via multiplexing (both Hamming weight/distance of intermediate values generated throughout the encryption rounds in both linear/non-linear functions). The MLU output drives a capacitive DAC (cap-DAC) that draws from the supply an energy contribution offsetting the data-sensitive contributions of the crypto-core, cancelling them out. After training, the MLU directly compensates the small-signal energy contributions that are truly correlated to the key (as defined by the relevant input features), avoiding indiscriminate higher power compensation of the entire crypto-core power as in the case of the prior art. More accurate MLU models (e.g., via better training, feature selection, model size) allow finer energy compensation and heightened level of protection (i.e., higher MTD).

In one implementation, one or more digit shifters are applied in the MLPM to achieve flexible alignment of the magnitude for different machine learning models' parameters, so that the machine learning model parameters can be more flexible with respect to the range and the generated output value can match well with the power DAC compensate energy. In FIG. 2, two shifters are shown. The function of each of the two shifters is the same, which is to shift the digit (bit). The circuit implementation for machine learning linear regression model only requires signed fixed-point Multiplication Accumulation Computations (MAC), thus achieving comparatively low hardware implementation cost.

The above-mentioned capacitive DAC (capDAC) can be implemented as an N-bit capDAC standard cell comprising N binary scaled gate clusters, whose transition and energy contribution is enabled only if their corresponding input bit from the MLU is 1 (coarse 9-bit compensation). The stdcell capDAC energy naturally tracks the crypto-core across process corners, voltages and temperatures. Automated placement & routing (PNR) in a single design iteration avoids manual optimization and iterative PNR, and the non-linearity due to its irregular placement is compensated by inserting and training redundant LSBs for fine 4-bit compensation.

In one implementation, the MLPM output drives a 10-bit power DAC that draws from the supply an energy contribution offsetting the data-sensitive contributions of the crypto-core, cancelling them out. The DAC comprises 10 binary-scaled standard-cell-based gate clusters corresponding to 210 energy levels to compensate. For each gate cluster, the transition and energy contribution are enabled only if their corresponding input bit from the machine learning model is 1. Due to the irregular placement, the energy drawn by each gate cluster is not perfectly linear for each energy level, especially for the smallest contributions which are the LSBs. Accordingly, such non-linearity is further compensated by inserting 7 redundant LSBs for finer compensation, which avoids manual optimization or iterative PNR to reach a given linearity target.

The power estimation unit and the power compensation unit may not need to respond instantaneously, as their latency requirement is relaxed by the DC-DC conversion and the supply DECAP, since they integrate and hence spread the exposure of information-sensitive power contributions over a longer time window.

Figure 3:
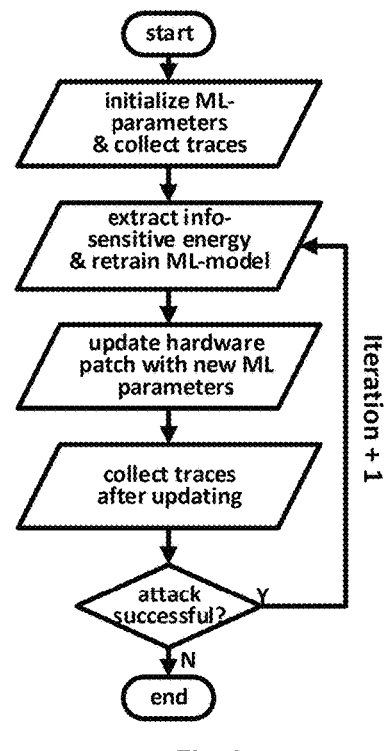
FIG. 3 is a flowchart showing a machine learning iterative training strategy according to an embodiment of the invention.

FIG. 3 shows a machine learning iterative training strategy according to an embodiment of the invention. The strategy enables compensation of all information leakage sources.

At step 1, power traces are collected with the initialized machine learning model. At step 2, throughout correlation power analysis (CPA) attacks are conducted to find all information-sensitive samples during encryption. Based on the selected information-sensitive samples, information-sensitive energy is extracted by cumulating the overall energy during the corresponding period, which is also the output of the MLPM. At step 3, an offline training is conducted to update the ML parameters, which are then mapped into the model to implement the desired hardware patch. If the requirement on MTD is not met yet, another round of retraining is conducted for further MTD improvement. In this way, the hardware patch parameters can be extracted. The linear nature of the power dependence on data and the overall consumption assures monotonic convergence under a progressively higher number of iterations.

To demonstrate the protection performance of embodiments of the invention, a 40 nm testchip was designed and fabricated. Firstly, a power analysis (EM) attack on AES without and with an embodiment of the invention is conducted using silicon measurement results.

Figure 4:
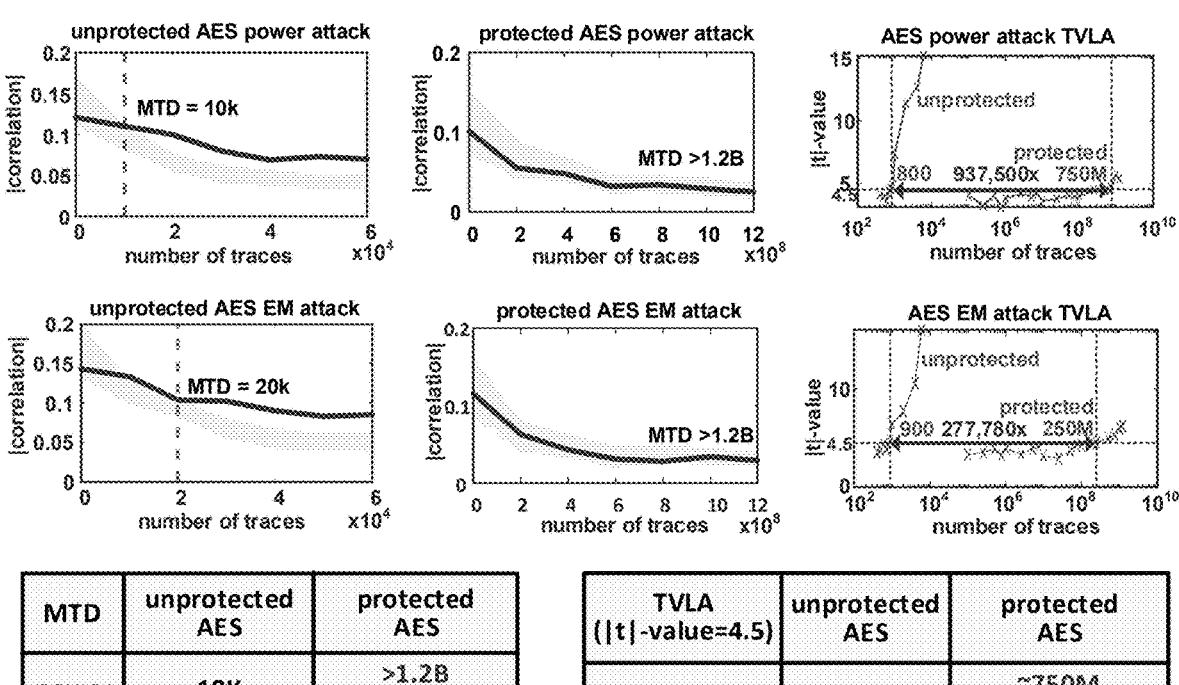
FIG. 4 shows protection performance of a machine learning-based design-adaptive counteraction framework/device according to an embodiment for a AES crypto core.

FIG. 4 shows the protection performance of the machine learning-based design-adaptive counteraction framework and device according to an embodiment for an AES crypto core. As seen in FIG. 4, the unprotected AES under power analysis (EM) attack discloses the key after MTD=10K (20K) traces, whereas the protected core increases MTD to more than 1.2B, resulting in 120,000× (60,000×) MTD improvement over unprotected AES. For further validation, test vector leakage assessment (TVLA) on unprotected AES crypto-core reaches the |t|-value target of 4.5 at 800 traces for the power attack, and 900 for the EM attack. With embodiments of the invention, protection increases to 750M and 250M, providing an improvement of 937,500× and 277,780× compared to the unprotected version, confirming robustness of AES against side-channel attacks.

Figure 5:
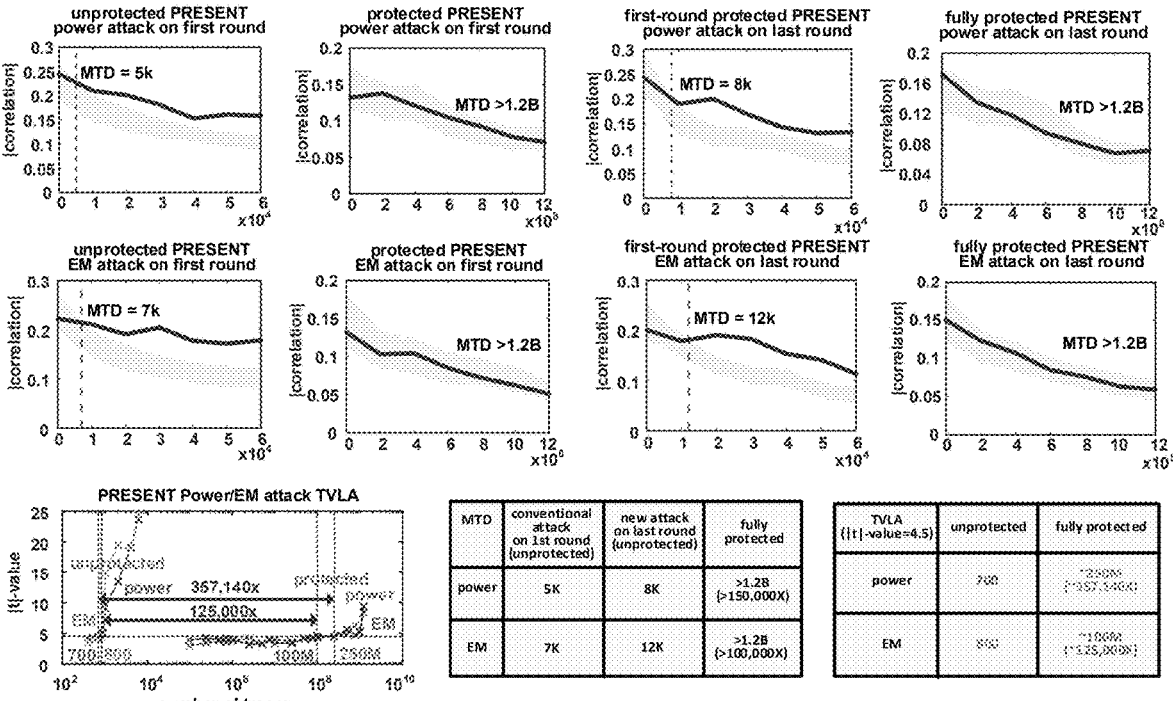
FIG. 5 shows protection performance of a machine learning-based design-adaptive counteraction framework/device according to an embodiment for a PRESENT crypto core.

FIG. 5 shows the protection performance of the machine learning-based design-adaptive counteraction framework and device according to an embodiment for a PRESENT crypto core. To demonstrate the hardware API capability of embodiments of the invention, the attacks were repeated on a PRESENT crypto-core, while retraining the same on-chip model with the same circuit implementation and the same power domain, adapting to the PRESENT cipher rather than AES. As seen in FIG. 5, the unprotected PRESENT under power analysis (EM) attacks immediately discloses the key after 5K (7K) traces, whereas the protected core raised the MTD to more than 1.2B. The resulting 240,000× and 171,000×MTD improvement over unprotected PRESENT is in line with the results on AES.

The hardware patching capability of embodiments of the invention was demonstrated by re-training the MLPM to protect PRESENT from a recently discovered side-channel vulnerability. The newly found attack differs from conventional attacks to the first round of PRESENT, in that it attacks the PRESENT last round bit permutation structure. The new attack well represents the typical case of vulnerabilities that are discovered along the chip lifecycle.

A power analysis (EM) attack to PRESENT last round new vulnerability without updated protection discloses the key after MTD=8K (12K) traces as shown in FIG. 5. As an illustration of the hardware patch concept, the inclusion of features from the last round and model retraining to counteract both the conventional and the new attack offer again full protection with an MTD restored to 1.2B traces for both attacks. This translates into a substantial MTD improvement by over 150,000× for power analysis, and 100,000× for EM attacks. Similarly, TVLA on the PRESENT cipher is highly consistent with the results previously discussed for AES. For unprotected PRESENT crypto-core, TVLA reaches the |t|-value target of 4.5 at 700 traces for power attacks, and 800 traces for EM attack. In contrast, protection provided by embodiments of the invention increases such trace count to 250M and 100M, providing an improvement of 357,140× and 125,000× compared to the unprotected version.

Figure 6:
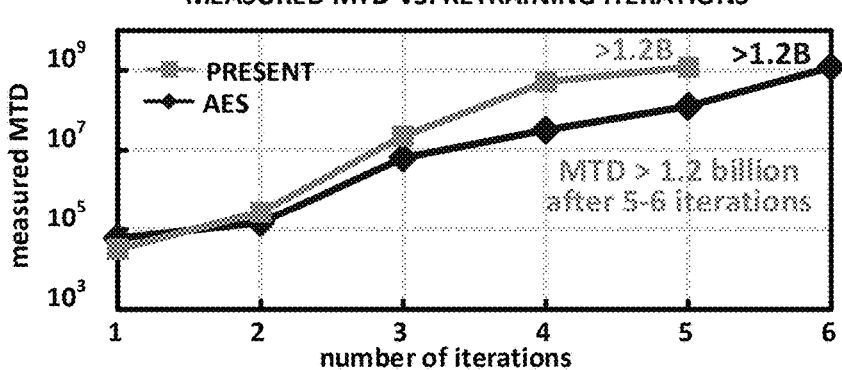
FIG. 6 shows iterative machine learning model training affecting the measured MTD for AES and PRESENT.

FIG. 6 shows how iterative machine learning model training affects the measured MTD for AES and PRESENT. A larger number of training iterations better captures such power contributions, and rapidly improves compensation accuracy, increasing MTD to the state-of-the-art billion-scale trace count. With reference to FIG. 6, the MTD for both protected cores monotonically increases with the number of training iterations. Both crypto cores reach an MTD of 1.2B after 5 or 6 iterations. Thus a larger number of training iterations allows to better capture the information-sensitive contributions including the crypto core, the machine learning power estimation unit, and the power compensation unit. The compensation accuracy rapidly increases to reach the state-of-the-art billion-scale trace count.

The following describes the various features and associated technical advantages of embodiments of the invention.

| Feature | Technical Advantage |
|---|---|
| Machine learning model iterative training for high side-channel attacks protection performance | The side-channel attacks protection performance of embodiments of the invention is due to the above-described MLPM iterative training strategy, and has been verified on both AES/PRESENT crypto-cores using measurement results, which is among the best compared with the state-of-the-art. The MLPM is iteratively trained and updated so that the possible information leakage of the protected crypto-core as well as the counteraction is fully included in the model. |
| Post-silicon upgradability for security fixes over time | Post-silicon upgradability makes the hardware counteraction highly flexible and beneficial to secure large-scale deployments. By simply wirelessly pushing the newly trained machine learning model weights to distributed nodes along the entire lifecycle, the security fixes for new attack/vulnerability over time can be achieved with low cost as a "hardware patch". |
| Re-programmability for reuse across ciphers | Just like software APIs, embodiments of the invention provide a public interface (such as protected rounds, protected signals, etc.) for crypto IP cores to follow. This enables reuse across ciphers in single- or multi- standard secure chips by simply changing the counteraction configuration parameters as "hardware API". |
| Machine learning-based targeted energy compensation for low power overhead | Instead of overall energy, small-signal information-sensitive energy is extracted and directly compensated by machine learning targeted modelling, thus reducing power overhead during protection. |
| Fully-automated standard-cell based design | All sub-modules retain fully-automated standard-cell based design for easy and wide adoption, system integration and in-situ protection. The standard-cell capDAC energy naturally tracks the crypto-core across process corners, voltages and temperatures. Automated placement and routing (PNR) in a single design iteration avoids manual optimization and iterative PNR. |

According to an embodiment, there is provided a method for counteracting side-channel attacks (SCA), comprising: using a machine learning unit (MLU) that is connectable to a cryptographic core, the MLU comprising: a feature extractor unit configured to extract information-sensitive signals from the cryptographic core and to generate machine learning features based on the information-sensitive signals; and a machine learning-based power estimator unit configured to output cumulative information-sensitive energy based on the generated machine learning features. The method further comprises using a power compensation unit that is configured to cancel out the cumulative information-sensitive energy so as to counteract side-channel attacks (SCA). In other words, the method involves using the feature extractor unit to extract information-sensitive signals from the cryptographic core and to generate machine learning features based on the information-sensitive signals; and using the machine learning-based power estimator unit to output cumulative information-sensitive energy based on the generated machine learning features, and using the power compensation unit to cancel out the cumulative information-sensitive energy so as to counteract side-channel attacks (SCA).

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A device for counteracting side-channel attacks (SCA), comprising:
a machine learning unit (MLU) that is connectable to a cryptographic core, wherein the MLU:
extracts information-sensitive signals from the cryptographic core and to generate machine learning features based on the information-sensitive signals; and
outputs cumulative information-sensitive energy based on the generated machine learning features; and
cancels out the cumulative information-sensitive energy so as to counteract side-channel attacks (SCA).

2. The device according to claim 1, wherein the information-sensitive signals from the cryptographic core are selected based on multiplexing and/or clock gating logic.

3. The device according to claim 1, wherein the MLU adopts a linear regression model.

4. The device according to claim 3, wherein the linear regression model is based on equation (1) as follows:

$$y(w, x) = w_0 + \sum_{k=1}^{K}\sum_{d=1}^{D} w_{kd}x_{kd} \qquad \text{Eq. (1)}$$

where:
x are the generated machine learning features from the MLU,
w are pre-trained machine learning model parameters,
K represents a number of subkey blocks, and
D represents selected one or more of the generated machine learning features.

5. The device according to claim 4, wherein the pre-trained machine learning model parameters are updatable and subsequently mappable into the linear regression model to implement a hardware patch.

6. The device according to claim 1, wherein the MLU is connectable to a supply source, and wherein MLU is configured to draw an equivalent energy from the supply source to cancel out the cumulative information-sensitive energy.

7. The device according to claim 1, wherein the MLU comprises an N-bit capacitive digital-to-analog converter standard cell comprising N binary scaled gate clusters.

8. The device according to claim 7, wherein N is 10, and wherein the cumulative information-sensitive energy is expressed as 10-bit control signals.

9. The device according to claim 7, wherein a transition and an energy contribution of each of the gate clusters is enabled if a corresponding input bit from the MLU is 1.

\*    \*    \*    \*    \*